INVENTOR.
ERNST LAUBER
BY Kurt Kelman
AGENT

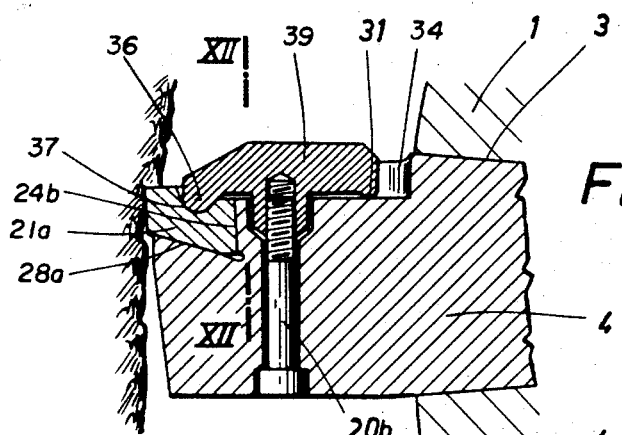
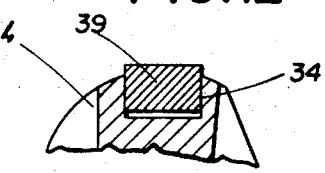
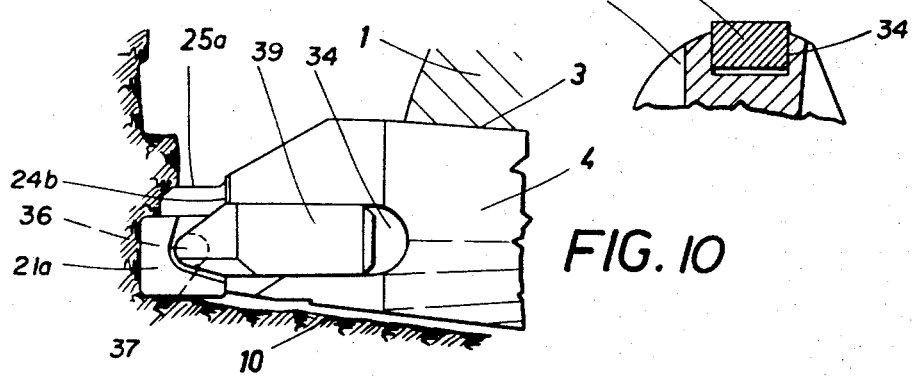
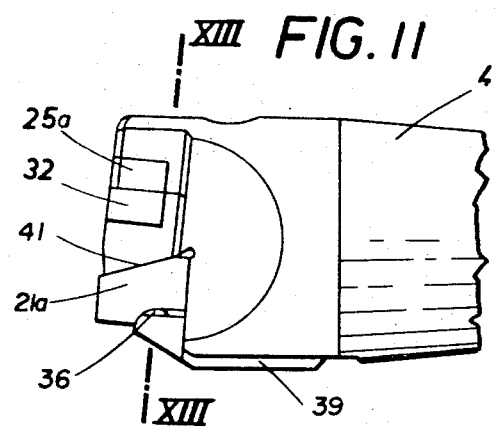
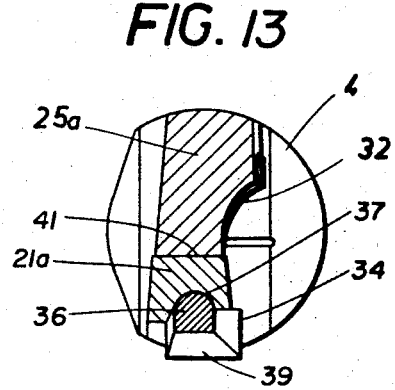

United States Patent Office 3,429,617
Patented Feb. 25, 1969

3,429,617
CUTTER HEAD FOR USE IN A TUNNEL DRIVING MACHINE
Ernst Lauber, Thun, Switzerland, assignor to Maschinenfabrik Habegger AG, Thun, Switzerland
Filed Dec. 6, 1966, Ser. No. 599,503
Claims priority, application Germany, Dec. 18, 1965, M 67,678; May 20, 1966, M 69,551
U.S. Cl. 299—93     4 Claims
Int. Cl. E21c 13/00

ABSTRACT OF THE DISCLOSURE

In a cutter head for use in a tunnel driving machine, a cutter bit holder is mounted in a radial bore in a cutter head body, and a cutter bit is detachably held between a bearing surface of a projecting portion of the holder and that of a clamping element. The cutter bit defines a spherical recess in one surface and a spherical bearing element extends from the bearing surface of the holder portion or of the clamping element into the spherical recess of the bit.

---

This invention relates to a cutter head for tunnel driving machines, which cutter head comprises cermet cutting edges provided on conical shanks which are inserted in bores in a cutter head body and protrude from the periphery of the cutter head body. Such cutter heads rotate about their own axis in operation and perform as a rule an additional orbital motion about the main axis of the machine to move along helical paths as a result of the feed movement of the machine. To form the cutting edges, cermet cutter bits have been brazed directly to the shanks which consist of steel. For more economical driving and to minimize the power required for driving the cutter heads, the chip cross-section for each tooth must be as large as possible. Cutting in rock gives rise to a phenomenon which is known from metal working and which resides in that an increase in the chip cross-section results in a reduction of the cutting pressure required per unit of area for disintegrating the structure. The increase in cross-section has previously been limited by the fact that it requires an increase in the cermet facings because the coefficient of thermal expansion of cermets is only one half that of the steel shank so that the cooling after the brazing gives rise to stresses, which in the case of brazed joints having large cross-sections results in a frequent failure of the teeth by stress-induced fractures. Besides, brazing must be carried out with great care and requires great experience so that it can hardly be carried out at the place where the tunnel driving machines are used.

Cermet-tipped teeth must have extremely rigid shanks to avoid detrimental vibration. This requirement leads to heavy shanks. The exchange of these shanks and their transportation to a re-grinding station involves a high expenditure of time and labor. For this reason, it has already been suggested to provide the shank with a weld-joined outer portion, which carries the brazed cutter-bit. When the tip has been worn, this outer portion is cut off at the joint to the shank proper and is replaced by a new outer portion, which is welded to the shank, which remains in position. Whereas this practice eliminates the need for replacing the entire shank, the cutting off and the subsequent weld-joining involve also a considerable expenditure of time and labor, and the fact that the cermet bit is brazed to the severable outer portion of the shank precludes an increase of the chip cross-section.

It is an object of the invention to eliminate these disadvantages and to provide for tunnel driving machines a cutter head which enables the use even of relatively large cermet bits to increase the chip cross-section whereas no difficulty is involved in the re-grinding and the replacement of these cutting tips.

The invention resides essentially in that cutting bits consisting entirely of cermet or of cermet-faced steel are replaceably clamped to the shanks, which are provided with bearing and abutment surfaces for the cutting bits, which surfaces serve to take up the forces which are due to the cutting operation. As the cutting bits are strictly mechanically connected to the shanks by clamping, any stresses due to brazing will be avoided. When the cutting bits must be re-ground or have been broken or damaged, it is sufficient to remove and replace the tips whereas the heavy shanks may remain in the bores in the cutter head body, i.e., in the machine. The bearing and abutment surfaces of the shanks will obviously be normal to the directions of the main cutting force, the backpressure and, if desired, the feeding force so that these forces are directly transmitted from the cutting bits to the shanks and the clamping parts may be relatively small although cutting forces amounting to several tons may occur in hard rock. Regardless of the stresses which were previously induced by brazing, all-cermet cutting bits can be given any size which is economically desirable. Cutting bits consisting of cermet-faced steel can obviously be used only in soft to moderately hard rock. As they carry on a narrow, thin cermet strip, the stresses induced by brazing will not be excessively high owing to the comparatively small area. In this case, smaller cermet facings can be used than before because the cutting bits can easily be replaced and can be relatively easily manufactured.

For clamping all-cermet cutting bits, a clamping element is provided, which is screw-connected to the shank and forces the cutting bit against the bearing surface of the shank. These cutting bits may have a spherical recess, which receives a ball mounted in a spherical recess in the bearing surface, or a ball-shaped extension of the clamping element. The ball or the spherical extension serves to prevent a displacement of the cutting bit and the spherical recess in the cutting bit prevents any notch action onto the cermet, which has a very high notch sensitivity. In a square cutting bit, two adjacent side edges will always be cutting. When these edges are blunt, the bit can be rotated through 180° and can now be used again so that the bit is reversible and can be used twice.

Preferred embodiments of the invention are shown by way of example on the accompanying drawing, in which:

FIG. 9 shows a portion of an inserted-tooth cutter head having different teeth, in a sectional view taken transversely to the axis of the cutter head.

FIG. 10 is a corresponding axial sectional view.

FIG. 11 is an elevation showing the forward portion of the tooth shank, viewed in a direction toward the face of the tunnel.

FIG. 12 is a transverse sectional view taken on line XV—XV of FIG. 9.

FIG. 13 is a sectional view taken on line XVI—XVI of FIG. 11.

Figure 2:
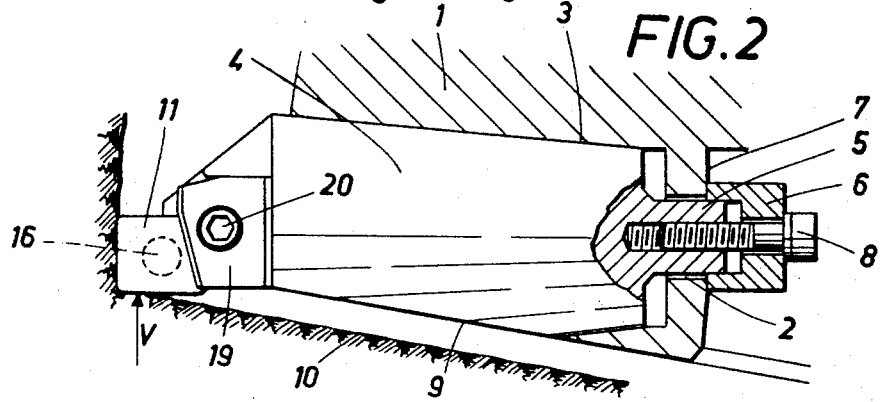
FIG. 2 is an axial sectional view showing the inserted-tooth cutter head.

A cutter head body 1 is formed with an internal annular groove 2 and conical bores 3, which receive conical shanks 4. At their rear end, these shanks are provided with rectangular prismatic extensions 5, which extend into the annular groove 2. The shanks are secured in the cutter head body by U-shaped bracket members 6 whose legs bear on both sides of the annular groove 2 on a shoulder 7 of the cutter head body. The shank extension 5 protrudes beyond the shoulder 7 between the legs of bracket 6 and is connected to the bracket by threaded bolt 8. The conical bores 3 intersect the end face of the cutter head body and the shanks 4 have a beveled flat surface 9 adjacent to the opening produced by the intersection. As shown in FIG. 2, this flat surface of the shank provides a sufficiently large clearance space for the flow of chips between the end face of the cutter head body and the face 10 of the tunnel even if the cutter bit has only a slight inclination relative to the end face of the cutter head body.

Figure 1:
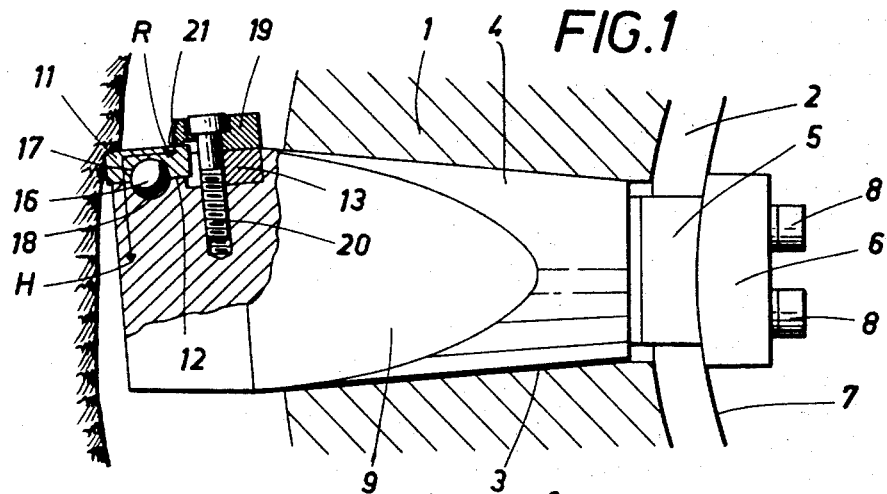
FIG. 1 is a sectional view taken transversely to the axis of the inserted-tooth cutter head and showing a portion of the latter.
Figure 3:
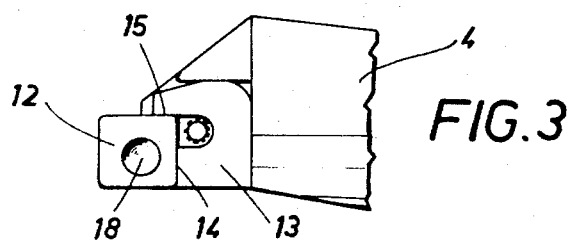
FIG. 3 is a similar view showing the outer portion of a tooth with the holding-down member removed.
Figure 4:
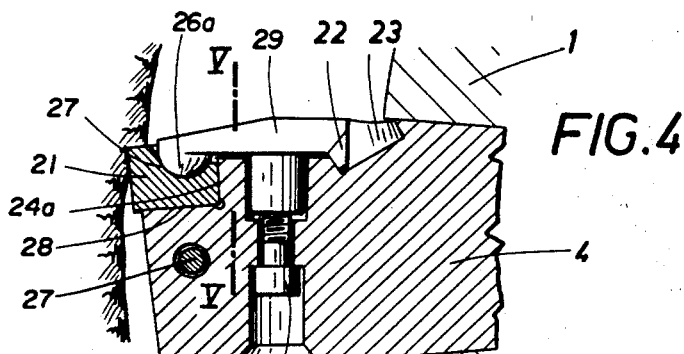
FIG. 4 shows an inserted-tooth cutter head having different teeth in a sectional view taken transversely to the axis of the cutter head.
Figure 5:
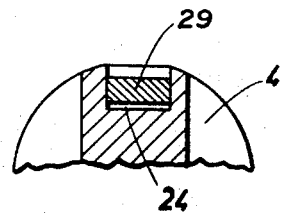
FIG. 5 is a corresponding transverse sectional view taken on line V—V of FIG. 4.

According to FIGS. 1 to 3, the shanks 4 carry square cutter bits 11 of cermet material. The main cutting force H and the backpressure R acts in a plane which is normal to the axis of the bit holder constituted by shank 4. The feeding force V acts in the direction of the axis. These forces are received from the cutter bit and transmitted to shank 4 by bearing surface 12, which extends at right angles to the main cutting force H and is engaged by cutter bit 11. A suitable recess of the shank receives an angle member 13, which is formed with two lateral abutment surfaces 14, 15 for taking up the backpressure and the feeding force. To enable a machining of the bearing surface 12, the latter is slightly elevated. To center cutter bit 11 and to prevent its displacement, a ball 16 is provided, which engages a hemispherical recess 17 in the cutter bit and a similar recess 18 in the bearing surface 12. A clamping element 19 lies over the angle member 13 and is clamped against the shank by a screw 20. The clamping element has a rounded pressure bar 21, which acts on the cutting bit 11 adjacent to that edge of the bit which is opposite to the nose of the bit. The bar 21 extends at an oblique angle to said edge. The peripheral end face of the clamping element 19 is beveled to ensure a satisfactory flow of chips.

In the embodiment shown in FIGS. 4 to 8, the shank 4 is provided with the bearing surface 28 and a lateral abutment surface 24a, which takes up the backpressure. The cutter bit 21 has in its top face a spherical recess 27 which receives a spherical extension 26a of the clamping element 29. The clamping element 29 has at its other end a rounded pin 22, which engages an oblique bore 23 in the cutter head body. When the screw 20a is being tightened, the cutter bit 21 is not only urged against the bearing surface 28 but by the engagement of the pin 22 with the oblique bore 23 and the resulting wedge action is also urged against the abutment surface 24a. Being inserted in a groove 24 in the shank, the clamping element can transmit to the shank 4 the feeding force which is transmitted to the clamping element by the spherical extension 26a. In this case too, the flat design and the bevel of the clamping element 29 ensure a satisfactory flow of chips.

Figure 6:
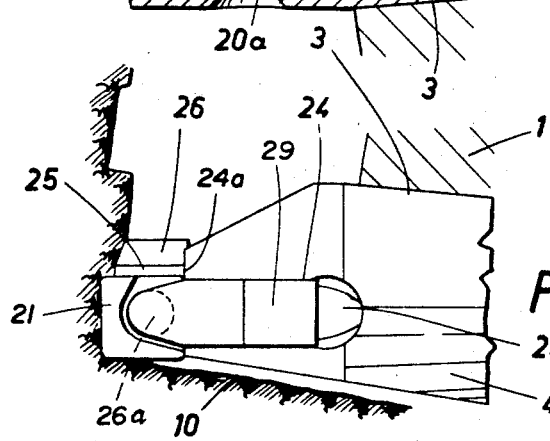
FIG. 6 shows this embodiment in a view similar to FIG. 2.
Figure 7:
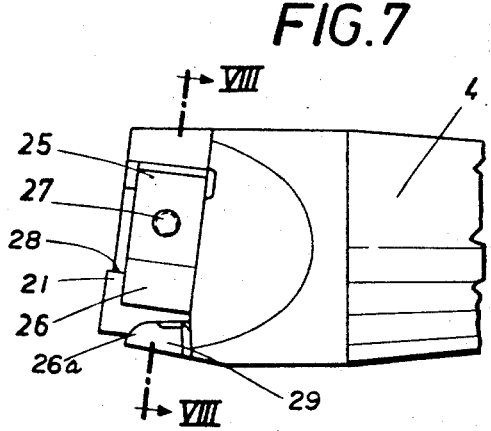
FIG. 7 is a view of the outer portion of the tooth shank taken in the direction toward the face of the tunnel.
Figure 8:
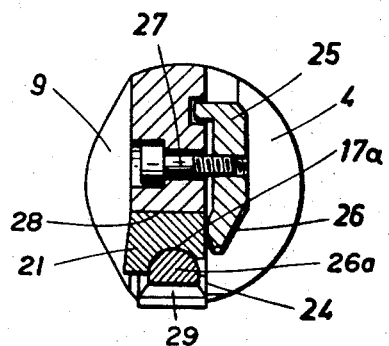
FIG. 8 is a transverse sectional view taken on line VIII—VIII of FIG. 7.

If the feed increment in the axial direction exceeds the width of the cutter bit, cuts along a helix will result and there will be lands between the convolutions in this helix. This is indicated in FIG. 6. To enable a removal of these lands, breaking wedges 25 are screw-connected to the shanks 4 adjacent the cutter bit on the side which is remote from the tunnel face. These wedges have inclined surfaces 26 for breaking off the lands. To reduce the wear, these inclined surfaces may have a cermet facing applied by surface welding. When the screw 27 is being tightened, the curved facing of the breaking wedge 25 is forced against the cutter bit 21 so that an initial stress results, which opposes the feeding force.

According to FIGS. 9 to 13, the shanks 4 have again a bearing surface 41 for engagement by the cutting bit 21a, and a lateral abutment surface 24b. These two surfaces 41, 24b are at an acute angle to each other and the cutting bit 21a has a corresponding wedge shape. The cutting bit 21a has also a spherical recess 37, which receives the spherical extension 36 of the clamping element 39. The latter is inserted in a groove 34 in the shank and is tightened down onto the shank by a screw 20b. At the end remote from the cutting bit 21a, the clamping element has a pressure surface 31, which bears on the bottom of the groove 34. Owing to the acute-angled or wedgelike arrangement of the surfaces 41, 24b the cutting bit 21a is forced against the abutment surface 24b by the clamping element and by the main cutting pressure itself, and the clamping element does not exert a shearing action.

As is shown in FIGS. 11 and 13, the radially outer portion of the shank is provided with a projection 25a on the side remote from the face 10 of the tunnel. This projection is provided with a cermet facing 32 and serves as a breaking wedge.

What is claimed is:

1. A cutter head for use in a tunnel driving machine, comprising
   (1) a cutter head body defining a radially extending bore;
   (2) a cutter bit defining a spherical recess in one surface;
   (3) a cutter bit holder fixedly mounted in said bore and having a portion projecting therefrom beyond the periphery of the cutter head body;
   (4) a cutter bit clamping element removably mounted on said projecting cutter bit holder portion,
      (a) the projecting cutter bit holder portion and the clamping element defining bearing surfaces for the cutter bit between which the cutter bit is detachably held on the holder; and
   (5) a spherical bearing element extending from one of said bearing surfaces adjacent said one cutter bit surface into the spherical recess in said cutter bit surface.

2. The cutter head of claim 1, wherein said projecting cutter bit holder portion defines one of said bearing surfaces opposite said clamping element, the cutter bit being held between said one bearing surface and the clamping element, the one cutter bit surface defining the spherical recess being adjacent said one bearing surface and said one bearing surface defining a complementary spherical recess, and said spherical bearing element being a ball mounted in said complementary recesses.

3. The cutter head of claim 1, wherein said clamping element is a clamping plate screwed to the projecting cutter bit holder portion, said portion defines one of said bearing surfaces opposite said clamping plate, the cutter bit being held between said one bearing surface and the clamping plate, the one cutter bit surface defining the spherical recess being adjacent the clamping plate, and the spherical bearing element projecting from the clamping plate into said recess.

4. The cutter head of claim 3, wherein said projecting cutter bit holder portion defines an additional one of said bearing surfaces extending from the bearing surface opposite the clamping plate towards the clamping plate, the clamping plate is mounted in a radially extending groove on said projecting cutter bit holder portion, with the spherical bearing element forming an extension on one end of the clamping plate, a rounded lug extending from the other end of the clamping plate into an oblique bore in the projecting cutter bit holder portion, and said clamping plate being screwed to the projecting cutter bit holder portion intermediate the clamping plate ends.

References Cited

UNITED STATES PATENTS

| | | | |
|---|---|---|---|
| 936,793 | 10/1909 | Middleton | 299—93 X |
| 3,024,856 | 3/1962 | Henning | 175—410 X |
| 3,271,080 | 9/1966 | Gowanlock | 299—93 X |

FOREIGN PATENTS 680,950  10/1952  Great Britain.

ERNEST R. PURSER, *Primary Examiner.*